(12) United States Patent
Bliss et al.

(10) Patent No.: US 7,715,143 B2
(45) Date of Patent: May 11, 2010

(54) DELTA-SIGMA PLL USING FRACTIONAL DIVIDER FROM A MULTIPHASE RING OSCILLATOR

(75) Inventors: William Gene Bliss, Thornton, CO (US); Mark Chambers, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 338 days.

(21) Appl. No.: 11/965,777

(22) Filed: Dec. 28, 2007

(65) Prior Publication Data

US 2008/0158711 A1 Jul. 3, 2008

Related U.S. Application Data

(60) Provisional application No. 60/882,963, filed on Dec. 31, 2006, provisional application No. 60/966,555, filed on Apr. 30, 2007.

(51) Int. Cl.
G11B 21/04 (2006.01)
(52) U.S. Cl. ...................................................... 360/70
(58) Field of Classification Search .................. 360/70, 360/71, 75, 30, 31, 32, 48, 50, 51, 77.04; 369/59.1, 59.17, 47.14, 47.28
See application file for complete search history.

(56) References Cited

U.S. PATENT DOCUMENTS

| 6,178,053 | B1 * | 1/2001 | Narita | 360/25 |
|---|---|---|---|---|
| 6,181,660 | B1 * | 1/2001 | Hirayama et al. | 369/59.1 |
| 6,655,780 | B2 * | 12/2003 | Kimura | 347/23 |
| 6,823,877 | B2 * | 11/2004 | Kimura | 134/56 R |
| 6,967,799 | B1 * | 11/2005 | Lee | 360/51 |
| 6,972,540 | B1 * | 12/2005 | Wang et al. | 318/400.34 |
| 7,068,451 | B1 * | 6/2006 | Wang et al. | 360/51 |
| 7,242,650 | B2 * | 7/2007 | Tsai et al. | 369/47.28 |
| 7,251,098 | B1 * | 7/2007 | Wang et al. | 360/77.04 |
| 7,333,280 | B1 * | 2/2008 | Lifchits et al. | 360/51 |
| 7,391,583 | B1 * | 6/2008 | Sheh et al. | 360/48 |
| 7,391,584 | B1 * | 6/2008 | Sheh et al. | 360/51 |
| 7,411,758 | B1 * | 8/2008 | Cheung et al. | 360/75 |
| 7,460,326 | B1 * | 12/2008 | Sutardja | 360/75 |
| 7,468,855 | B1 * | 12/2008 | Weerasooriya et al. | 360/75 |
| 7,551,390 | B1 * | 6/2009 | Wang et al. | 360/77.04 |
| 7,613,587 | B2 * | 11/2009 | Starodubtsev et al. | 702/150 |
| 7,646,559 | B1 * | 1/2010 | Cheung et al. | 360/75 |
| 2006/0285467 | A1 * | 12/2006 | Senoo et al. | 369/59.17 |
| 2007/0097822 | A1 * | 5/2007 | Iwanaga | 369/53.2 |
| 2008/0002270 | A1 * | 1/2008 | Bliss et al. | 360/51 |
| 2008/0007855 | A1 * | 1/2008 | Vityaev et al. | 360/51 |
| 2008/0144454 | A1 * | 6/2008 | Bottemiller et al. | 369/47.14 |

* cited by examiner

*Primary Examiner*—Fred Tzeng
(74) *Attorney, Agent, or Firm*—Garlick Harrison & Markison; Bruce E. Garlick

(57) ABSTRACT

A disk drive controller includes a servo system operable to associate a time stamp with an arrival of a servo wedge, a firmware loop and core PLLs in the read channel. The firmware loop is operable to determine a period between the arrival of a pair of consecutive servo wedges and produce a desired frequency of when to read/write data to disk based on the period between the arrival of a pair of consecutive servo wedges. Processing circuitry is operable to adjust a clock signal, wherein the clock signal itself is not locked to the data and produce a fine control signal for the core PLLs in the read channel. These core PLLs are operable to determine a phase and/or frequency associated with when an analog signal is sampled and/or written to disk, wherein these core PLLs comprises Fractional N Sigma Delta PLLs.

17 Claims, 10 Drawing Sheets

DELTA-SIGMA PLL USING FRACTIONAL DIVIDER FROM A MULTIPHASE RING OSCILLATOR

REFERENCES TO RELATED APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 60/882,963, entitled "Delta-sigma PLL using fractional divider from multi-phase ring oscillator,", filed Dec. 31, 2006.

2. U.S. Provisional Application Ser. No. 60/966,555, entitled "Delta-sigma PLL using fractional divider from multi-phase ring oscillator,", filed Apr. 3, 2007.

TECHNICAL FIELD OF THE INVENTION

The present invention relates generally to hard disk drives; and, more particularly, to the synchronization of a disk drive controller to a hard disk of the hard disk drive.

BACKGROUND OF THE INVENTION

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as desktop and laptop computers, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives (HDDs) include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk. The read/write mechanism also includes a disk drive controller.

All information stored on the hard disk is recorded in tracks, which are concentric circles organized on the surface of a platter. Data stored on the disks may be accessed by moving RW heads radially as driven by a head actuator to the radial location of the track containing the data. To efficiently and quickly access this data, fine control of RW hard positioning and sampling is required. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Within such HDDs, disk drive controllers control the various processes associated with the read/write of data to the physical media (hard disk). As the amount of data stored to the physical media increases, the ability to accurately read data from the physical media is adversely effected. This is further complicated as hard disk drives are forced into smaller form factor devices, the physical media or disk itself becomes smaller further increasing the need for increased storage density. Thus, smaller form factors and higher storage densities make these disks more susceptible to fluctuations of a disk clock as the disk itself may not necessarily rotate in circular fashion. The disk (i.e. physical media) itself may not necessarily rotate in a truly circular path. There may be some variations where the center of rotation may be off axis. Other variations arise from the mechanism used to drive the rotation of the disk, resulting in an elliptical path of the hard disk about the axis of rotation. This ellipse may change as the physical media shifts on the spindle or axis of rotation. These effects are most noticeable in small form factor device. In order to ensure that data is properly read from small form factor devices it is necessary to track the variations associated with the disk rotation to properly sample the data.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals may indicate like features and wherein.

DETAILED DESCRIPTION OF THE INVENTION

Embodiments of the present invention are illustrated in the Figures with like numerals generally used to refer to corresponding elements of the various drawings. However, elements having common numbering may have differing structure/operation in various embodiments of the present invention.

Embodiments of the present invention are incorporated within a Hard Disk Drive (HDD), with a disk drive controller and its various components incorporating aspects of the present invention. The disk drive controller includes a servo system operable to associate a time stamp with an arrival of a servo wedge, a firmware loop, and core PLLs associated with a read channel. The firmware loop is operable to determine a period between the arrivals of a consecutive servo wedges (Servo Marks (SSMs)) and produce a desired frequency of corresponding to read/write data of the disk based on the period between the arrivals of the consecutive SSMs of the servo wedges. Processing circuitry is operable to adjust a clock signal based upon the consecutive SSMs, wherein the clock signal itself may not be locked to the data but that may be used to produce a fine control signal for the core PLLs in the read channel. These core PLLs are operable to produce output signals that are used to sample and/or write data to the hard disk. In some embodiments of the present invention, the core PLLs are Sigma Delta PLLs, which may include fractional N dividers. The structure and operation of these core PLLs support increased accuracy in both the read and write access of the hard disk, thereby supporting greater storage capacity and smaller dimensions of the hard disk.

The Delta Sigma PLLs generate a frequency $F_{VCO}=F_{ref}*N_{eff}$, where $N_{eff}$ is the average N coming from a Multi-stAge noise SHaping (MASH) modulator that generates a time varying sequence of integers. Jitter of the output of the Delta Sigma PLL can be further reduced by using multiple phases of a ring oscillator and switching between different 'fractional N' values produced by the ring oscillator.

Embodiments of the present invention may employ two Sigma Delta PLLs in a Disk Clock system, which may be implemented in hardware. The Sigma Delta PLLs keep the Data PLL frequency locked (while the servo PLL can be phase and/or frequency locked). Generally, $F_{servonom}=F_{ref}*N_{servonom}$ where $N_{servonom}$ is the nominal fractional divider. The disk clock produces a time varying $N_{servo}$ (k) that moves around $N_{servonom}$. Hardware/software algorithms calculate and apply updates to the Data PLL(s) to cause the Data PLL(s) to maintain a near exact frequency lock to the hard disk.

Figure 1:
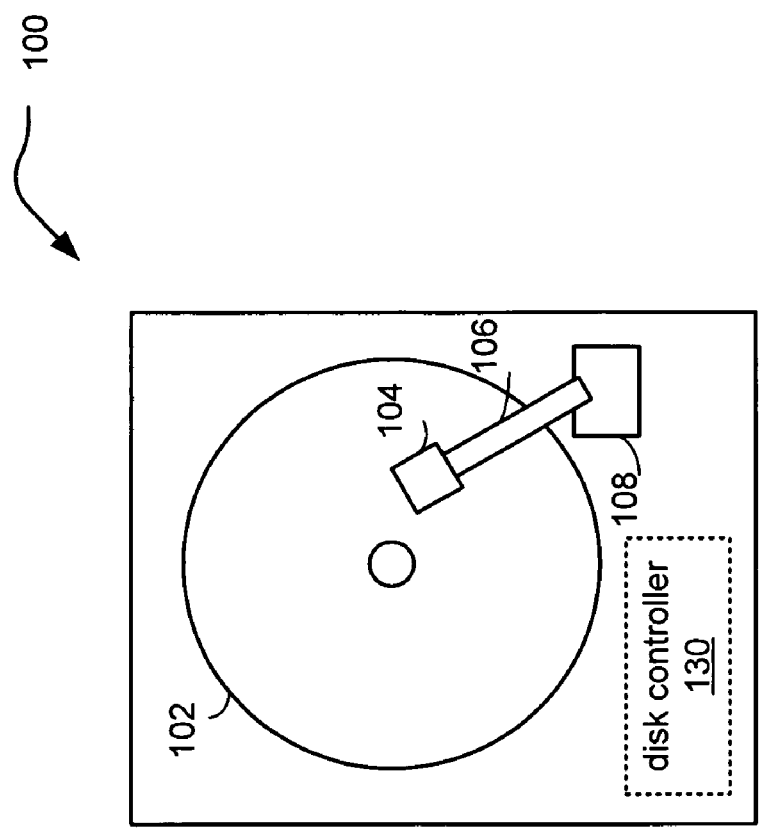
FIG. 1 is a system diagram illustrating a disk drive unit that incorporates structure and/or operations of embodiments of the present invention.

FIG. 1 is a system diagram illustrating a disk drive unit 100 that incorporates structure and/or operations of embodiments of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM; however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid (hard disk), a non-rigid, removable disk, or a non-removable disk, that consists of or is coated with magnetic material.

Disk drive unit 100 further includes one or more read/write heads 104 that are coupled to arm 106 that is moved by actuator 108 over the surface of the disk 102 either by translation, rotation or both. A disk drive controller 130 is included for controlling the read and write operations to and from the drive, for controlling the speed of the servo motor and the motion of actuator 108, and for providing an interface to and from the host device.

Figure 2:
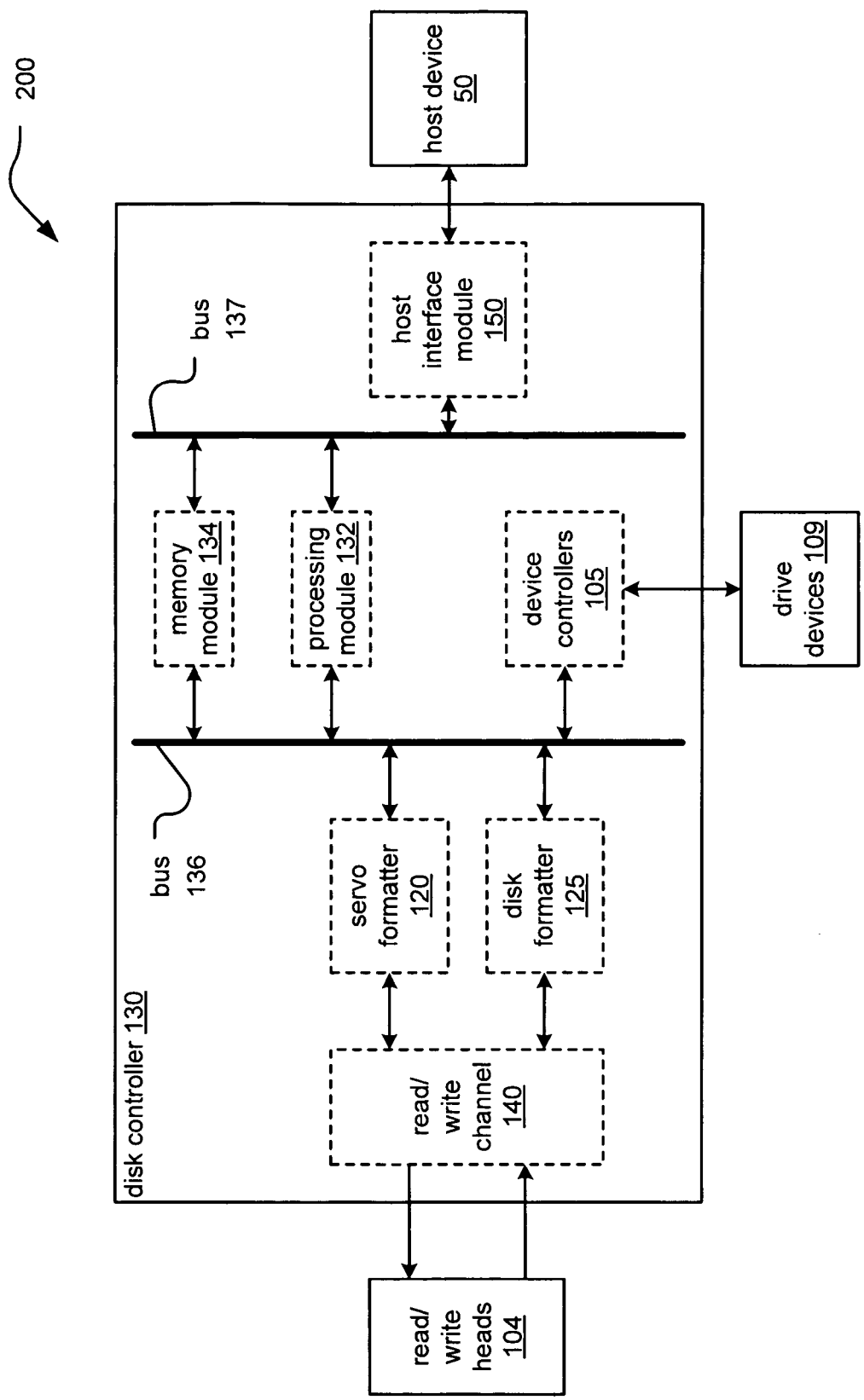
FIG. 2 is a block diagram illustrating an embodiment of a disk drive controller constructed and operating in accordance with embodiments of the present invention.

FIG. 2 is a block diagram illustrating an embodiment of a disk drive controller 130 constructed and operating in accordance with embodiments of the present invention. The disk drive controller operates as part of a system 200 that includes read/write heads 104, drive devices 109, and a host device 50. In particular, disk drive controller 130 includes a read/write channel 140 for reading and writing data to and from disk 102 through read/write heads 104. Disk formatter 125 controls the formatting of data and provides clock signals and other timing signals that control the flow of data written to, and data read from disk 102 via the read/write heads 104 and the read/write channel 140. Servo formatter 120 provides clock signals and other timing signals based on servo control data read from disk 102 via the read/write heads 104 and the read/write channel 140. Device controllers 105 control the operation of drive devices 109 such as actuator 108 and the servo motor, etc. Host interface module 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk drive controller 130 further includes a processing module 132, memory module 134, bus 136, and bus 137. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

The device controllers 105, the processing module 132, the memory module 134, the read/write channel 140, the servo formatter 120, the disk formatter 125, and host interface module 150 are interconnected via bus 136 and bus 137. The host interface module 150 may be connected to only bus 137. However, in other embodiments, such connectivity may differ. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk drive controller 130 are implemented as part of a system on a chip (SoC) integrated circuit. In an embodiment, this SoC integrated circuit includes a digital portion that may include additional modules such as protocol converters, linear block code encoding and decoding modules, etc., and an analog portion that includes device controllers 105 and optionally additional modules, such as a power supply, etc. In a further embodiment, the various functions and features of disk drive controller 130 may be implemented in a plurality of integrated circuit devices that communicate and combine to perform the functionality of disk drive controller 130.

When the drive unit 100 is manufactured, disk formatter 125 writes a plurality of servo wedges along with a corresponding plurality of servo address marks (SSMs) at equal radial distance along the disk 102. The SSMs are used by a timing generator for triggering the "start time" for various events employed when accessing the media of the disk 102 through read/write heads 104.

Figure 3:
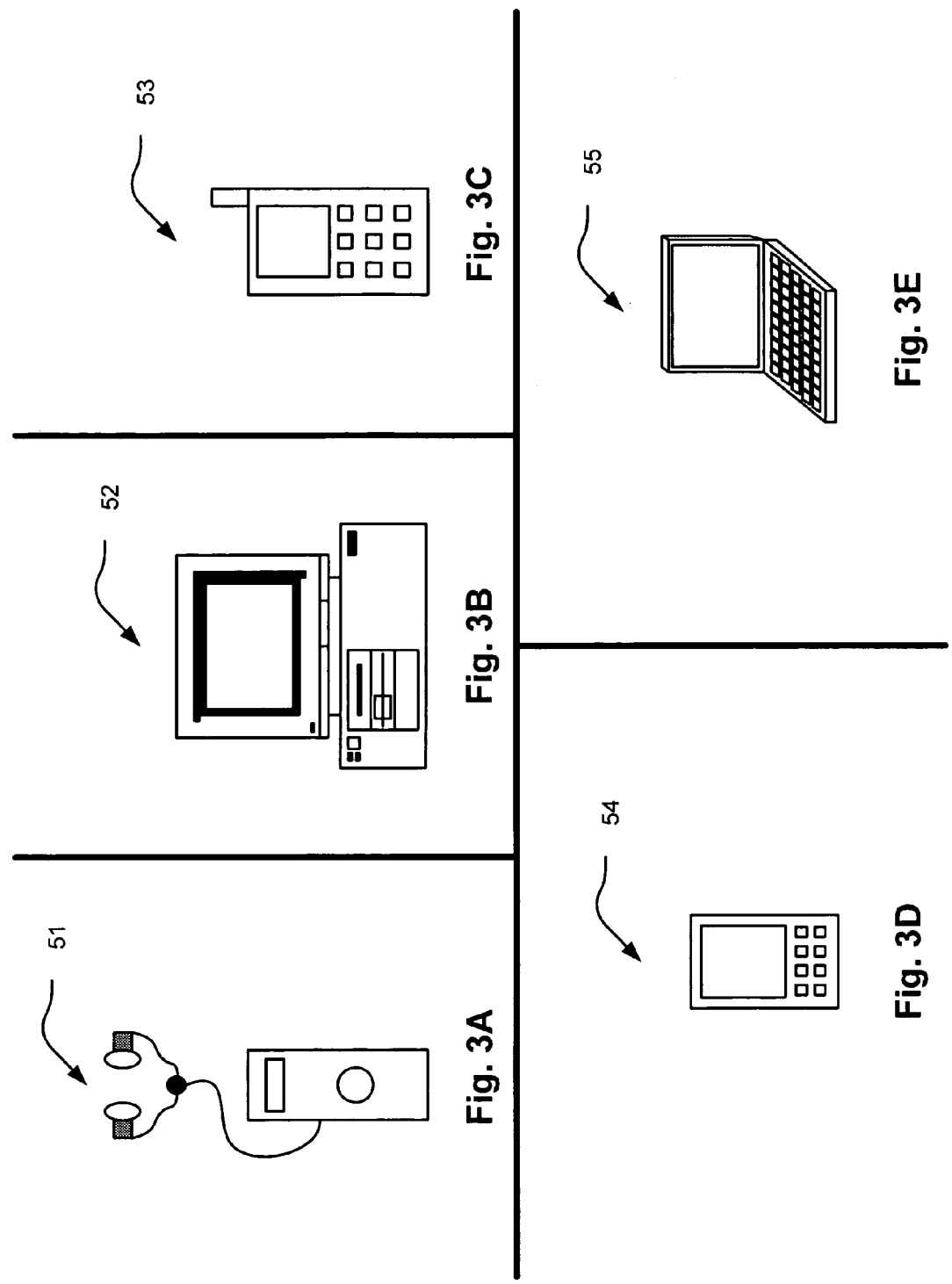
FIGS. 3A through 3E illustrate various devices that employ hard disk drives constructed in accordance with embodiments of the present invention.

FIGS. 3A through 3E illustrate various devices that employ hard disk drives constructed in accordance with embodiments of the present invention. FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG point photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 4:
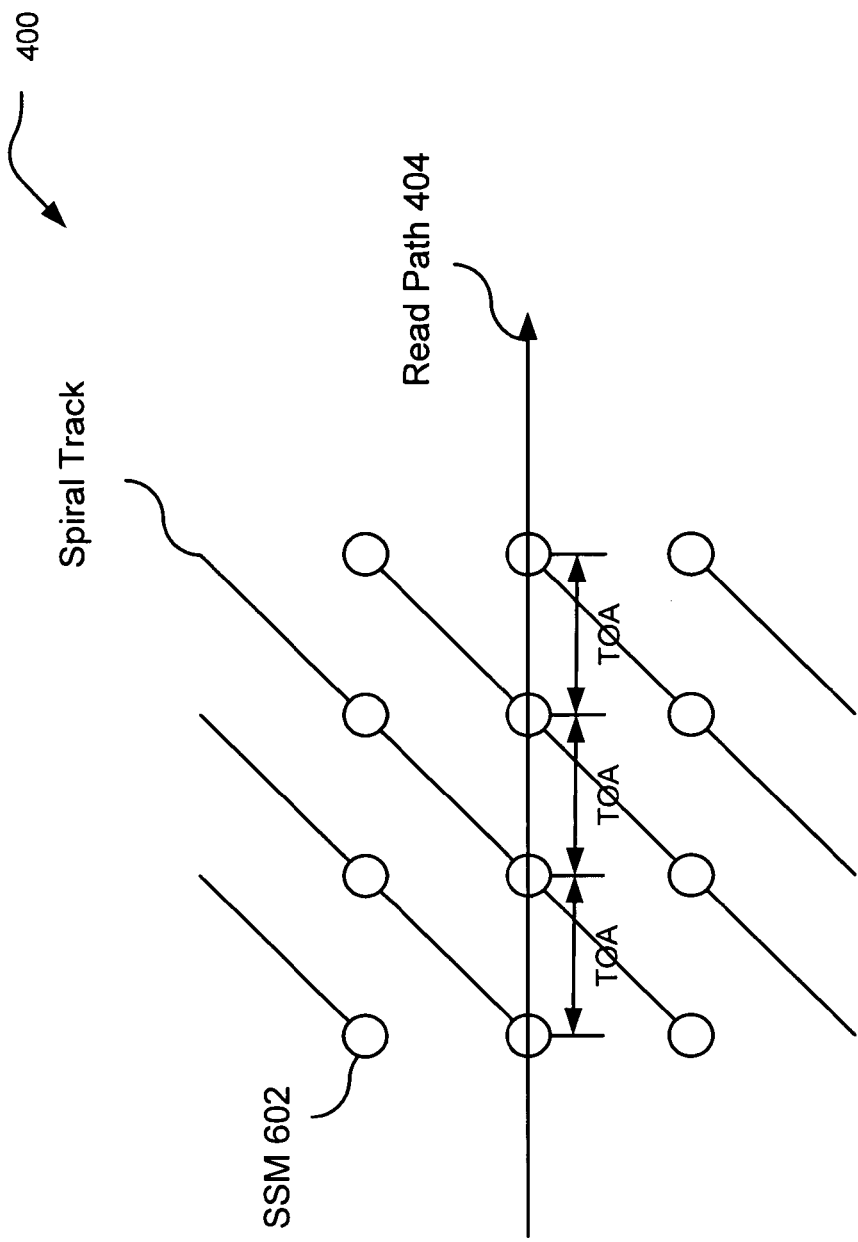
FIG. 4 is a diagram illustrating how the time of arrival (TOA) of the Read Write (RW) head between Servo Address Marks (SSMs) can indicate the velocity of the RW head within a read path.

FIG. 4 is a diagram illustrating how the time of arrival (TOA) of the Read Write (RW) head between Servo Address Marks (SSMs) can indicate the velocity of the RW head with respect to the disk within a read path. FIG. 4 depicts how the time of arrival (TOA) of the RW head between SSMs 402 can indicate the velocity of the RW head within read path 404. Additionally, this information can be used to determine frequency and phase that is used to sample an analog waveform read from the disk.

In FIG. 4, the $TOA_{actual}$ should equal $TOA_{expected}$. This equality indicates that the read path is radially aligned and the RW head maintains a constant linear velocity during a read operation. A $TOA_{error}$ between $TOA_{actual}$ and $TOA_{expected}$ indicates a non constant linear velocity during a read operation, which may be due to errors associated with the servo motor used to rotate the disk or the alignment of the axis or rotation of the disk. Both of these sources of error may be magnified by the small geometries demanded of small form factor disks. Such errors may result in an improper sampling of the analog waveform read from the disk, degrading the integrity of the data read from the disk. For proper radial alignment and operation with a constant linear velocity, the $TOA_{actual}$ should equal $TOA_{expected}$.

As each SSM 402 is encountered by the read-write head the instantaneous velocity of the read-write head relative to the physical media may be measured very accurately. With knowledge of the position of the SSM the instantaneous rotation of the physical media may be easily computed. This information may be used to very accurately determine when to sample the disk for analog wave form data. Embodiments of the present invention may apply this information in order to lock data sampling of an Analog to Digital (ADC) converter to an analog wave form read from the disk (physical media). Likewise, this information may be employed to lock data writing to the disk.

Figure 5:
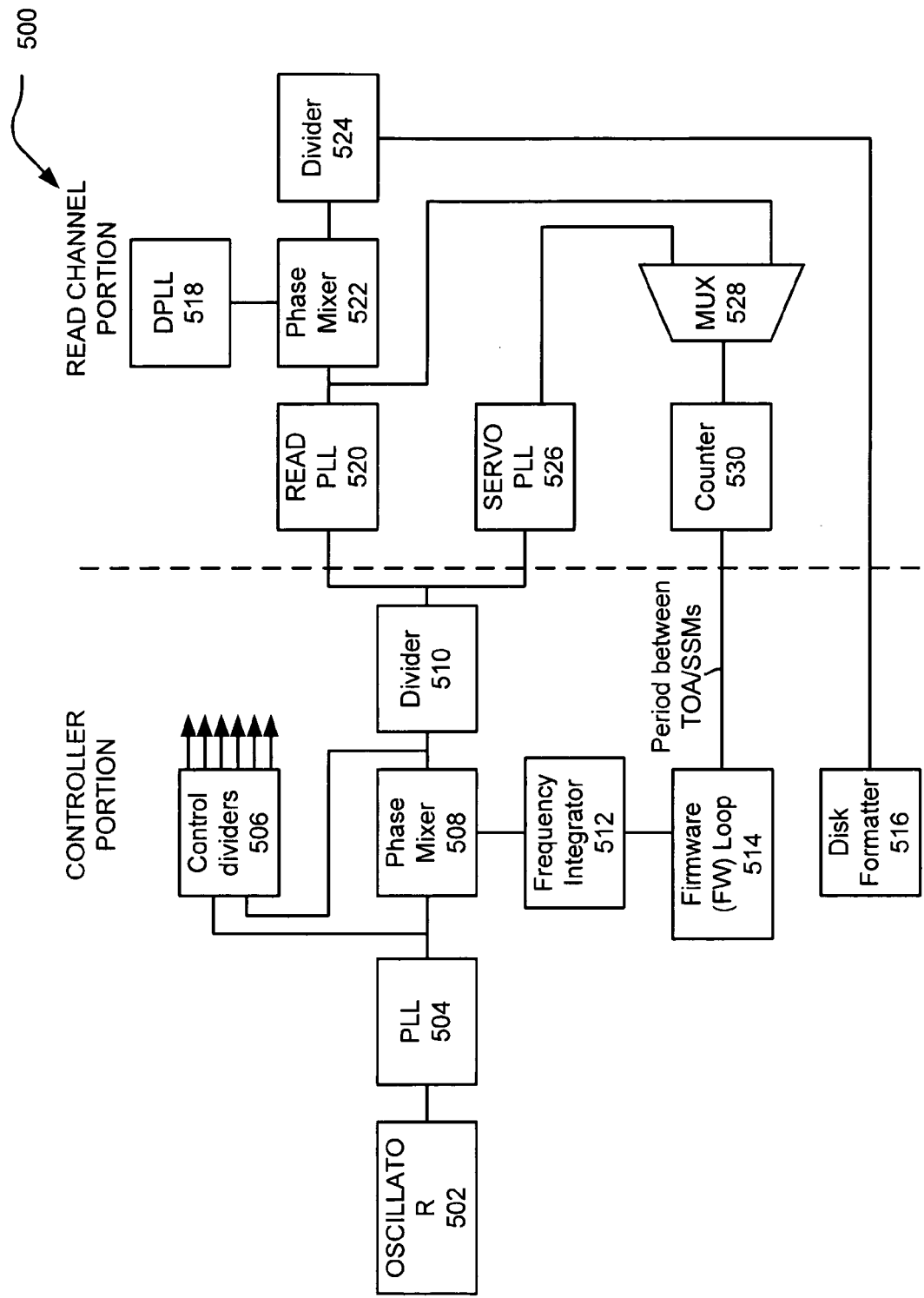
FIG. 5 is a block diagram illustrating a Data Locking Clock (DLC) scheme constructed and operating in accordance with embodiments of the present invention.

FIG. 5 is a block diagram illustrating a Data Locking Clock (DLC) scheme 500 constructed and operating in accordance with embodiments of the present invention. DLC clocking scheme 500 is partitioned between a controller portion and a read channel portion. The controller portion of the DLC clocking scheme 500 includes oscillator 502, PLL 504, control dividers 506, phase mixer 508, divider 510, frequency integrator 512, firmware loop 514, and disk formatter 516. The read channel portion of the DLC clocking scheme 500 includes Data PLL (DPLL) 518, read PLL 520, phase mixer 522, divider 524, servo PLL 526, multiplexer 528, and counter 530.

The read channel portion reads/detects the time of arrival of SSMs (or other timing information in differing embodiments). A time stamp is recorded with the arrival of each new servo wedge (i.e. SSM). Embodiments of the present invention accurately measure this time, which can be compared to adjacent the TOA or SSM's time stamp. A period between the adjacent TOA or SSM is measured by counter 530 and then provided to firmware loop 514. This allows the instantaneous RPM (frequency) of the HDD to be determined. This information is used by the disk drive controller/read channel to adjust the core PLLs of the read channel. The core PLLs of prior device read channels have been analog PLLs that did not allow the fine control required by increasing data density and smaller form factors that exacerbate problems associated with a HDD that is not perfectly stable, at a constant RPM and perfectly circular. Thus the clock signals previously used are not synchronous to the data read/written from/to the disk. This resulted in a multitude of problems including format problems associated with reading the disk as well as reading writing data to the disk.

Thus, embodiments of the present invention may employ core PLLs (data PLL, Servo PLL, Read PLL) in the read channel operable to determine a phase and/or frequency associated with when an analog signal is sampled and/or written to disk, wherein the core PLLs are Sigma Delta PLLs that may employ fractional N constructs. Finer control and further improved results may be derived from using a multiphase ring oscillator in combination with the sigma delta PLLs.

Frequency integrator 512 supports the selection of desired phase. During normal drive operations for reading and writing the disk it is important to have the correct frequency for sampling with the read PLL (data PLL). Similarly during a self servo right it is important to have both phase and frequency properly controlled. Frequency integrator 512 is similar to a digital VCO and allows the desired phase and or frequency to be selected. The phase mixer 508 and the analog phase select 722 of FIG. 7 allow one of numerous phases to be selected. For example this may be one of 64 phases that may be selected in certain embodiments of the present invention. These multiple phases may be generated using a multiple ring oscillator. For example a four gate ring oscillator will create eight clocks at the same frequency having different phases. These phases are equally staggered. Additional circuitry may be used to interpolate between the eight phases in order to produce any number of phases.

Figure 6:
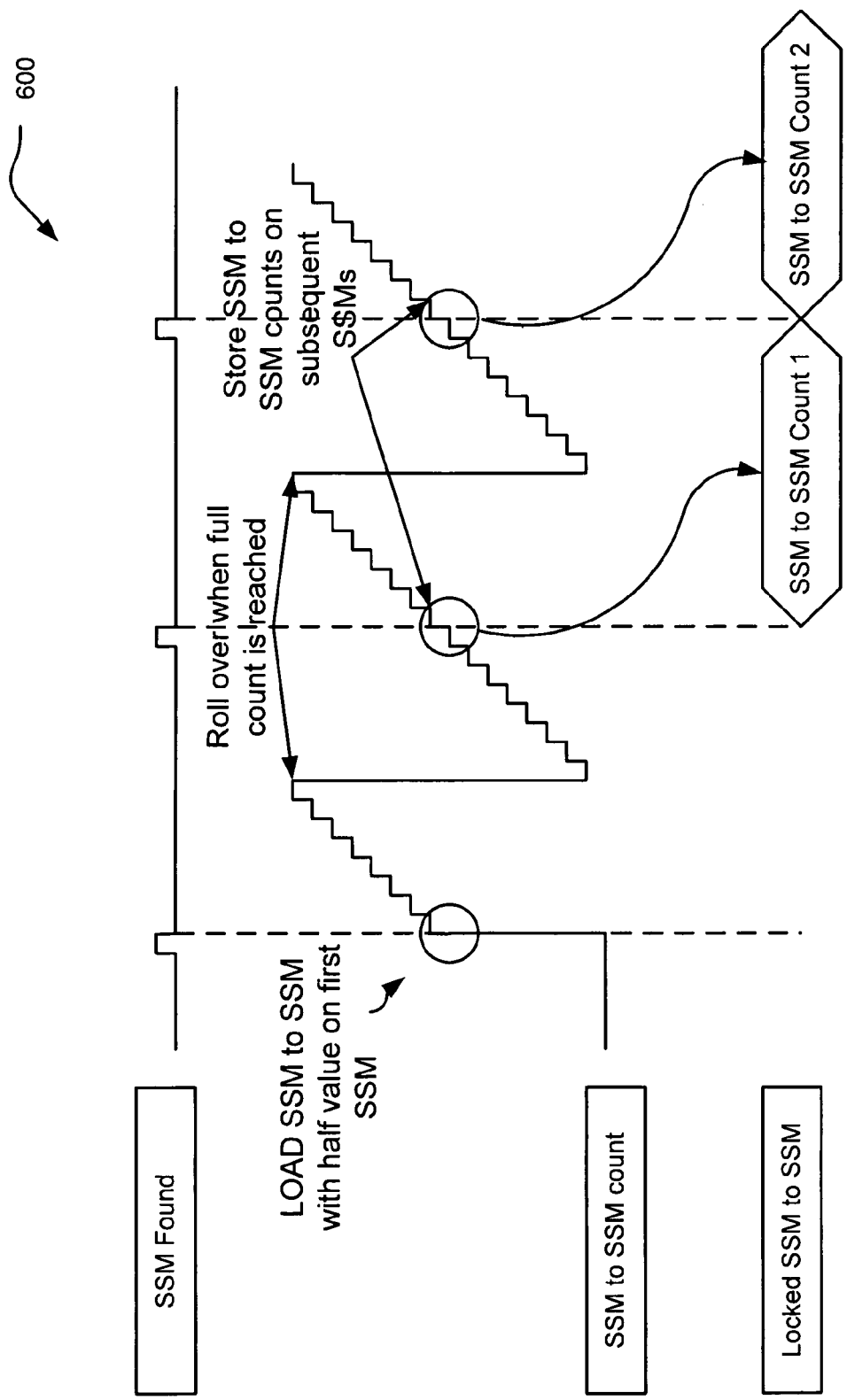
FIG. 6 is a timing diagram illustrating how an instantaneous period of a hard disk (i.e. frequency or RPM associated with the hard disk of a HDD) may be determined.

FIG. 6 is a timing diagram illustrating how an instantaneous period of a hard disk (i.e. frequency or RPM associated with the hard disk of a HDD) may be determined. This timing diagram shows first that the servo marks (SSM) are detected, a time stamp may be associated with this detection. The detection may also involve performing a bit where a half value based on a full bit count is identified. These counts roll over when a full count is reached. The half values found during these bid counts are then identified and have an associated time stamp. This allows a time period (shown as SSM to SSM Count 1, SSM to SSM Count 1, Count 2, etc.) to be determined which directly relates to the instantaneous RPM of the disk drive.

Figure 7:
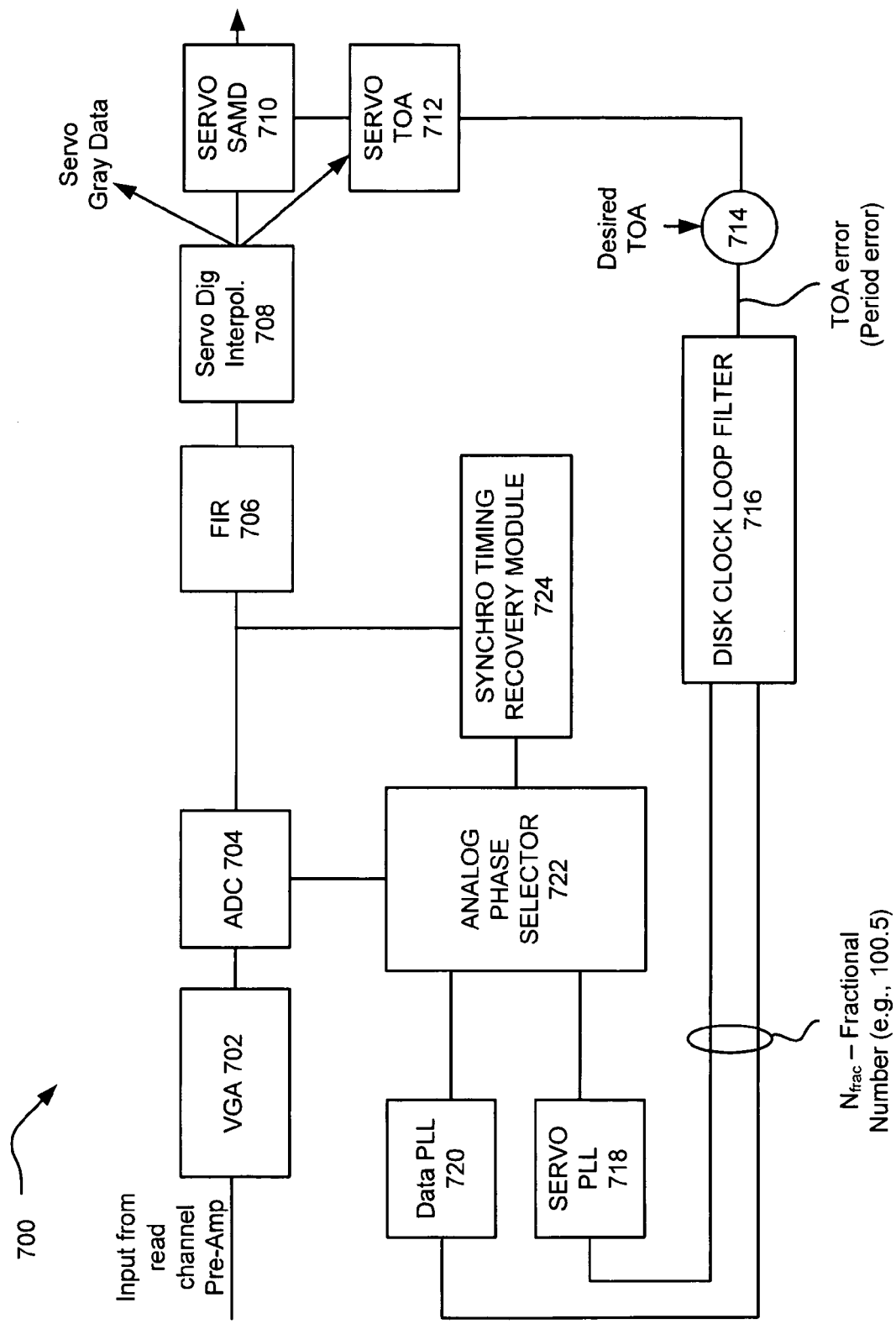
FIG. 7 is a block diagram illustrating of a servo disk clock circuit constructed and operating in accordance with embodiments of the present invention.

FIG. 7 is a block diagram illustrating of a servo disk clock circuit constructed and operating in accordance with embodiments of the present invention. Servo disk clock 700 includes Variable Gain Amplifier (VGA) 702, Analog to Digital Converter (ADC) 704, Finite Impulse Response (FIR) filter 706, servo digital interpolator 708, Servo Address Mark Detector SAMD block 710, servo TOA block 712, combiner 714, disk clock loop filter 716, servo PLL 718, data PLL 720, analog phase selector 722, and synchro-timing recovery module 724.

An analog signal is provided from a pre-amplifier to VGA 702, which amplifies the signal. An ADC 704 then samples the analog signal to produce a digital signal, which is provided to FIR filter 706, which filters the digital signal. The output of FIR filter 706 may also be provided as an input to Synchro Timing Recovery Module 724. The output of the FIR filter 706 is provided to the Servo Digital Interpolator 708, which produces several outputs. These include a servo gray data output, an output provided to the servo SAMD block 710, and an output provided to the servo wedge Time of Arrival (TOA) block 712. A time stamp associated with the servo wedge time of arrival may be used to determine an instantaneous RPM frequency associated with the disk drive. The measured time of arrival can be provided to a register in firmware or hardware wherein the time of arrival may be compared with a desired time of arrival. Other embodiments may compare consecutive time of arrivals to determine a period associated with the consecutive time of arrivals. This period may then be compared with a desired period. In either case the result of Combiner 714 is a timing error. Whether the timing error is a time of arrival error or a period error depends on the specific embodiment of the present invention. The timing error is provided to a firmware loop or Disc Clock Loop Filter 716 in order to produce a digital output (fractional number) to the core PLLs, which include a Data PLL 720 and a Servo PLL 718. The digital output provided to the core PLLs (Data PLL 720 and Servo PLL 718) is a fractional number in the embodiment of FIG. 7. The digital outputs of the core PLLs are used to perform an analog phase select using analog phase selector Module 722. The Synchro Timing Recovery Module 724 provides another input to the analog phase select selector module 724. This allows the proper frequency and/or phase to be selected for sampling by ADC 704.

Referring to both FIGS. 5 and 7, embodiments of the present invention help address problems exacerbated by small form factors, higher data storage densities, perpendicular versus longitudinal recording, the disk not being a perfectly stable, constant velocity, perfectly circular rotational platform, and shock and vibration associated with portable HDDs. These problems result in oscillator 502 no longer being synchronous with the analog signal being read from the disk. Read PLL 520 and servo PLL 526 of FIG. 5 and data PLL 720 and servo PLL 718 of FIG. 7 may now be delta sigma PLLs. These PLLs receive a digital word as an input shown on FIG. 7 as reg_n_frac_data and reg_n frac_servo. Where $$N_{frac\_data} = N_{frac\_servo} * \frac{F_{data}}{F_{servo}}.$$

Figure 8:
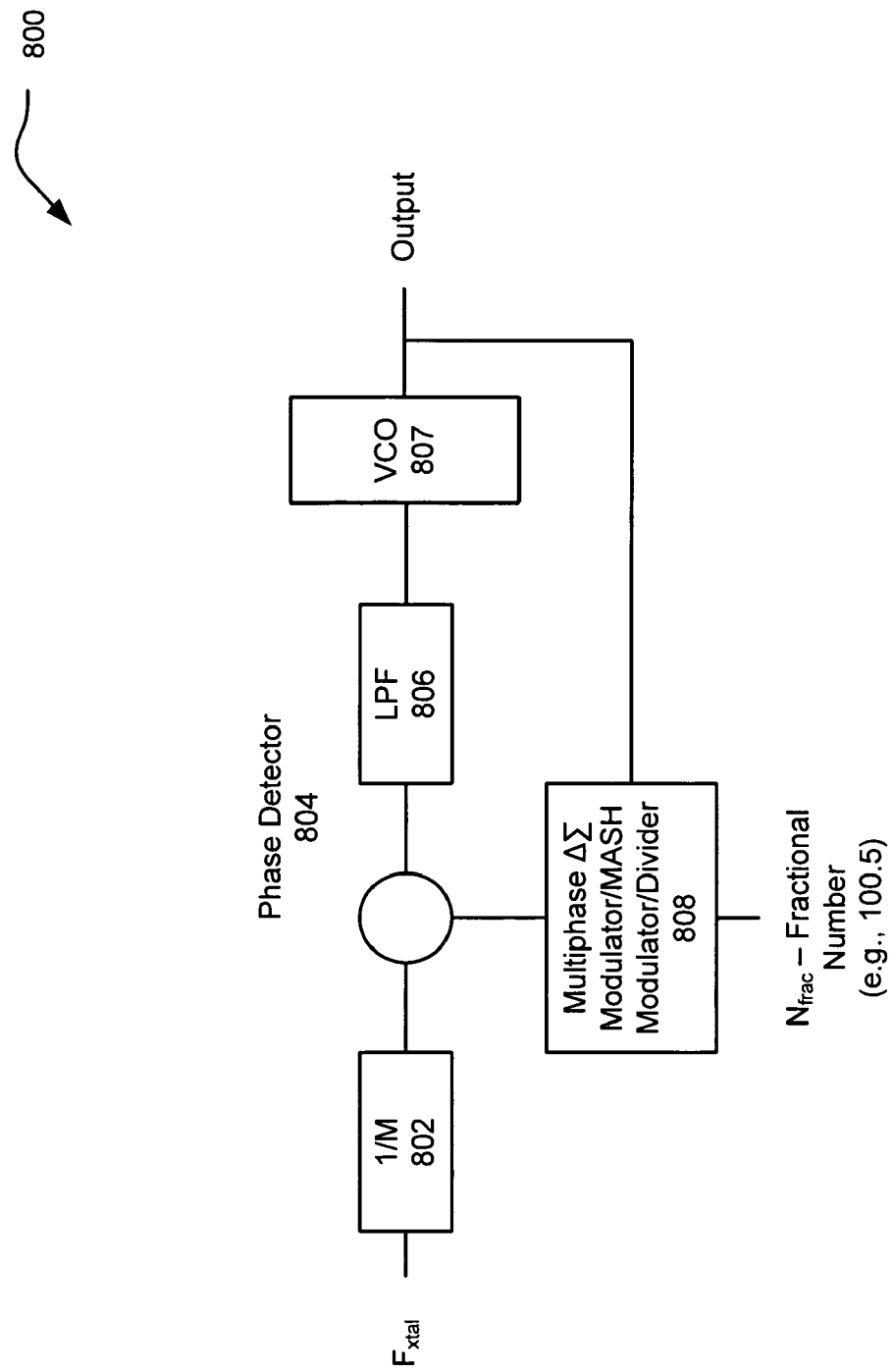
FIG. 8 is a block diagram illustrating an embodiment of a fractional N sigma delta Phase Lock Loop (PLL) constructed and/or operating according to one or more embodiments of the present invention.

FIG. 8 is a block diagram illustrating a first embodiment of a fractional N sigma delta Phase Lock Loop (PLL) constructed and/or operating according to one or more embodiments of the present invention. The illustrated portion of the sigma delta PLL 800 receives a crystal oscillation input $F_{XTAL}$ (from crystal oscillator) and also the input $N_{frac}$. The sigma delta PLL 800 includes a divide by M Module 802, a phase detector 804, a low pass filter 806, and a delta sigma modulator/MASH modulator/Divider 808. The divide by M module 802 receives the input $F_{xtal}$ and divides the input by M. The output of the divide by M module 802 is received by phase detector 804, which also receives an output from the delta sigma modulator/MASH modulator/Divider 808. An input $N_{frac}$ being a fractional number is provided to delta sigma modulator/MASH modulator/Divider 808.

The delta sigma modulator/MASH modulator/Divider 808 receives the fractional number $N_{frac}$ input as produced by the disk clock loop filter 716 of FIG. 7, which is a function of time. $N_{frac}$ (a function of time) is used by the delta sigma modulator/MASH modulator/Divider 808 to produce a sequence of dividers, N, that is uses to divide the input received from VCO 807 and to thereby produce an input to the phase detector 804.

For example, based upon an $N_{frac}$ input of 100.5, the delta sigma modulator/MASH modulator/Divider 808 may produce a series of dividers, N, of 100, 101, 100, 101 that are used to divide the output of the VCO 807 to produce input to the phase detector 804. The delta sigma modulator/MASH modulator/Divider 808 dithers N at a high enough rate that, when operated on by the low pass filter 806, the input to the VCO 807 is sufficiently smoothed.

The output of the delta sigma modulator/MASH modulator/Divider 808 is received by the phase detector 800, which compares the phase of its two inputs. The output of the phase detector 804, which represents a phase difference between its two inputs, is received by LPF 806, which filters the input. The filtered output of the LPF 806 is provided to VCO 807, which is an oscillation received by the delta sigma modulator/MASH modulator/Divider 808.

Figure 9:
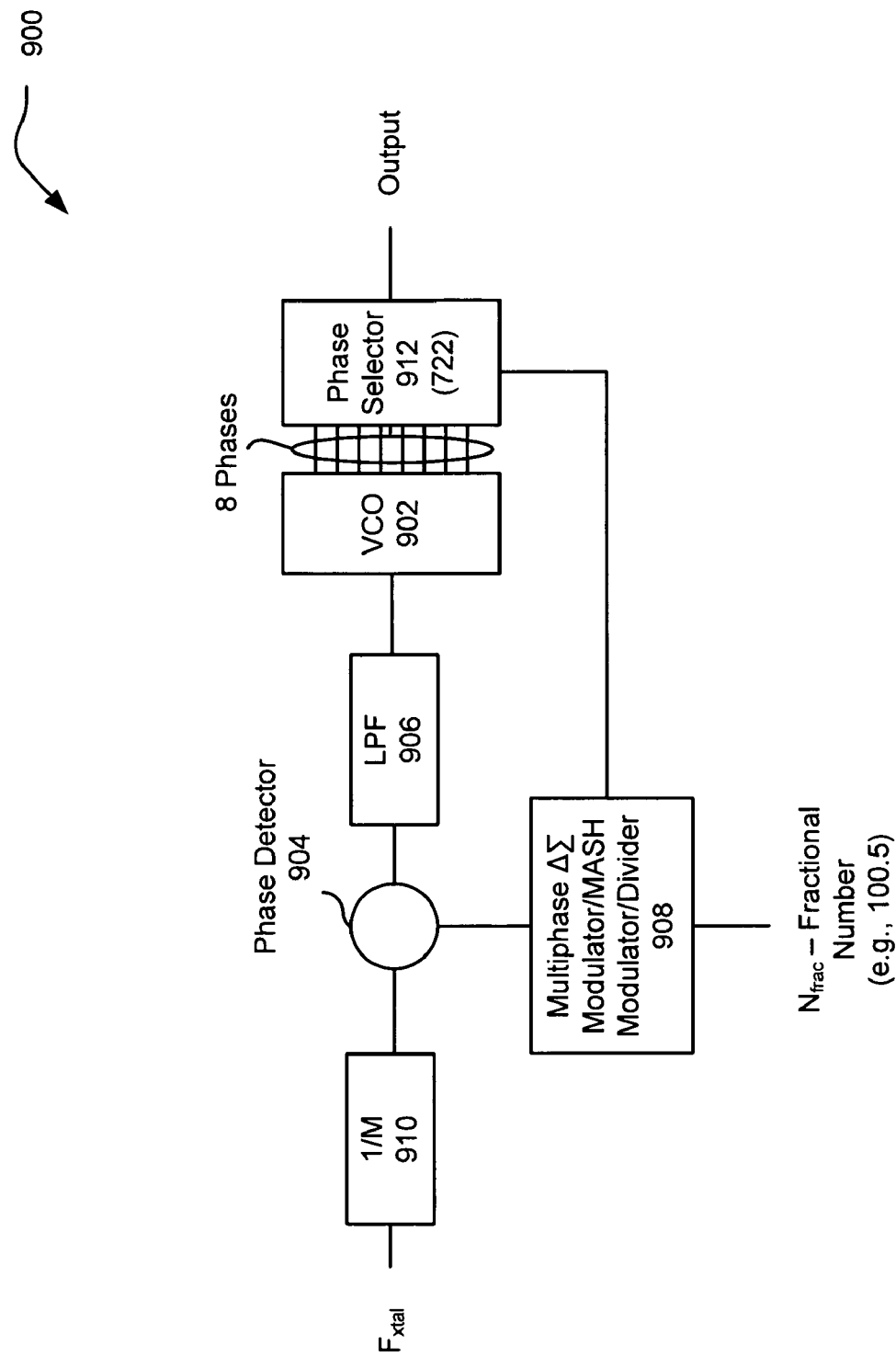
FIG. 9 is a block diagram illustrating another embodiment of a fractional N sigma delta Phase Lock Loop (PLL) constructed and/or operating according to one or more embodiments of the present invention.

FIG. 9 is a block diagram illustrating another embodiment of a fractional N sigma delta Phase Lock Loop (PLL) constructed and/or operating according to one or more embodiments of the present invention. The fractional N sigma delta PLL 900 receives a first input from a crystal oscillator having a crystal frequency $F_{XTAL}$ and includes a multiple phase VCO 902, a divide by M Module 910, a phase detector 904, a low pass filter 906, a delta sigma modulator/MASH modulator/Divider 908, and a phase selector 912. The phase selector 912 may be the same as the phase selector 722 of FIG. 7 in some embodiments.

As compared to the structure of FIG. 8, the fractional N sigma delta PLL 900 includes the multiple phase VCO 902 and the phase selector 912. The multiphase aspect provided by VCO 902 allows even finer control than that provided by the fractional N sigma delta PLL 800 of FIG. 8.

Figure 10:
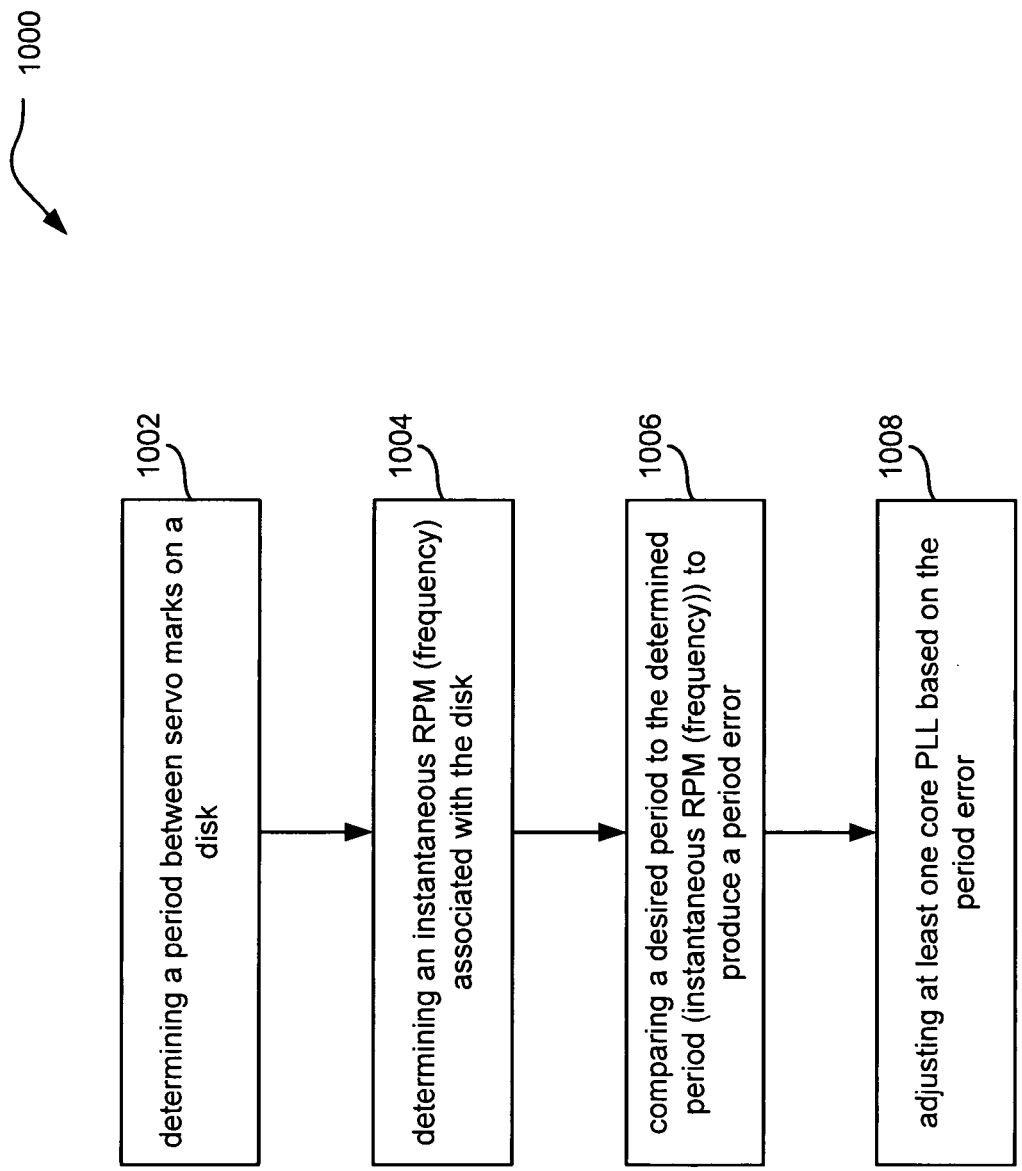
FIG. 10 is a flow chart illustrating operation according to one or more embodiments of the present invention for maintaining data PLL frequency/phase lock, and/or a server PLL frequency/phase lock.

FIG. 10 is a flow chart illustrating operation according to one or more embodiments of the present invention for maintaining data PLL frequency/phase lock, and/or a server PLL frequency/phase lock. Operations 1000 begin in step 1002 where a period between server marks on a disk beneath a read write head are determined. This may be done as described previously with reference to FIG. 6. In step 1004 an instantaneous RPM of the disk based on the determined period from step 1002 may be determined. This allows in step 1006 a comparison between the determined period (frequency) to be made in order to produce a period (frequency) error. Then in step 1008 at least one corp. PLL associated with the read write path may be adjusted based on the period (frequency) error associated with the instantaneous RPM of the disk. As stated before, improved results may be derived from fractional processing that is made possible with the use of a sigma delta PLL. Finer control and further improved results may be derived from using a multiphase ring oscillator in combination with the sigma delta PLLs.

This allows errors associated with a noncircular, nonstable rotational platform to be addressed as well as other errors associated where these errors are exacerbated by small form factor high data density hard disk drives. The core PLLs of the read write channel may be a servo PLL and a read (data) PLL. Circuitry within the disk lock DLC clocking scheme of the present invention allow adjusting when the analog wave form is to be read or written to the disk.

In summary, embodiments of the present invention provide a disk drive controller is provided. The drive controller includes a servo system operable to associate a time stamp with an arrival of a servo wedge, a firmware loop and core PLLs in the read channel. The firmware loop is operable to determine a period between the arrival of a pair of consecutive servo wedges and produce a desired frequency of when to read/write data to disk based on the period between the arrival of a pair of consecutive servo wedges. Processing circuitry is operable to adjust a clock signal, wherein the clock signal itself is not locked to the data and produce a fine control signal for the core PLLs in the read channel. These core PLLs are operable to determine a phase and/or frequency associated with when an analog signal is sampled and/or written to disk, wherein these core PLLs comprises Sigma Delta PLLs.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method for maintaining Phase Lock Loop (PLL) lock of a Hard Disk Drive (HDD) Controller with a disk, the method comprising:
   determining a period between servo marks on the disk controlled by the HDD Controller as the disk rotates;
   determining an instantaneous RPM of the disk based on the determined period;
   comparing a desired period to the determined period to produce a period error; and
   adjusting at least one core PLL of a read channel of the HDD controller based on the period error associated with the instantaneous RPM of the disk, wherein at least one core PLL comprises a Fractional N Sigma Delta PLL.

2. The method of claim 1, wherein the period is determined by measuring a time difference between consecutive servo marks on the disk.

3. The method of claim 1, wherein adjusting at least one core PLL of a read channel based on the period error associated with the instantaneous RPM of the disk comprises adjusting the at least one core PLL when an analog waveform is to be read from the disk.

4. The method of claim 1, wherein adjusting at least one core PLL of a read channel based on the period error associated with the instantaneous RPM of the disk comprises adjusting the at least one core PLL when an analog waveform is to be written to the disk.

5. The method of claim 1, wherein adjusting at least one core PLL of a read channel based on the period error associated with the instantaneous RPM of the disk allows a Servo PLL to be phase and/or frequency locked.

6. The method of claim 1, wherein the core PLL comprises a Data (Read) PLL and a Servo PLL.

7. The method of claim 1, wherein the disk is within a Hard Disk Drive (HDD).

8. The method of claim 7, wherein data is written longitudinally or perpendicularly within the HDD.

9. A disk drive controller and read channel, comprising:
   a servo system operable to associate a time stamp with an arrival of a servo wedge of a disk as it rotates;
   a firmware loop operable to:
      determine a period between the arrival of a pair of consecutive servo wedges;
      produce a desired frequency of when to read/write data to the disk based on the period between the arrival of a pair of consecutive servo wedges;
   circuitry operable to compare a desired period to the determined period to produce a period error and produce a digital output; and
   at least one core PLL in the read channel operable to determine a phase and/or frequency associated with when an analog signal is sampled and/or written to disk based on the digital output, wherein the at least one core PLL comprises Fractional N Sigma Delta PLL.

10. The disk drive controller and read channel of claim 9, wherein the servo system detects the arrival of a servo wedge by reading servo marks on the disk.

11. The disk drive controller and read channel of claim 9, further comprising circuitry operable to adjust the digital output to the at least one core PLL of a read channel based on the period error.

12. The disk drive controller and read channel of claim 11, wherein adjusting at least one core PLL of a read channel based on the period error comprises adjusting when an analog waveform read from the disk is to be sampled.

13. The disk drive controller and read channel of claim 11, wherein adjusting at least one core PLL of a read channel based on the period error comprises adjusting when an analog waveform is to be written to the disk.

14. The disk drive controller and read channel of claim 11, wherein adjusting at least one core PLL of a read channel based on the period error allows a Servo PLL to be phase and/or frequency locked.

15. The disk drive controller and read channel of claim 9, wherein the core PLL comprises a Data (Read) PLL and a Servo PLL.

16. The disk drive controller and read channel of claim 9, wherein the disk is within a Hard Disk Drive (HDD).

17. The disk drive controller and read channel of claim 9, wherein data is written longitudinally or perpendicularly within the HDD.

* * * * *